Patented May 8, 1923.

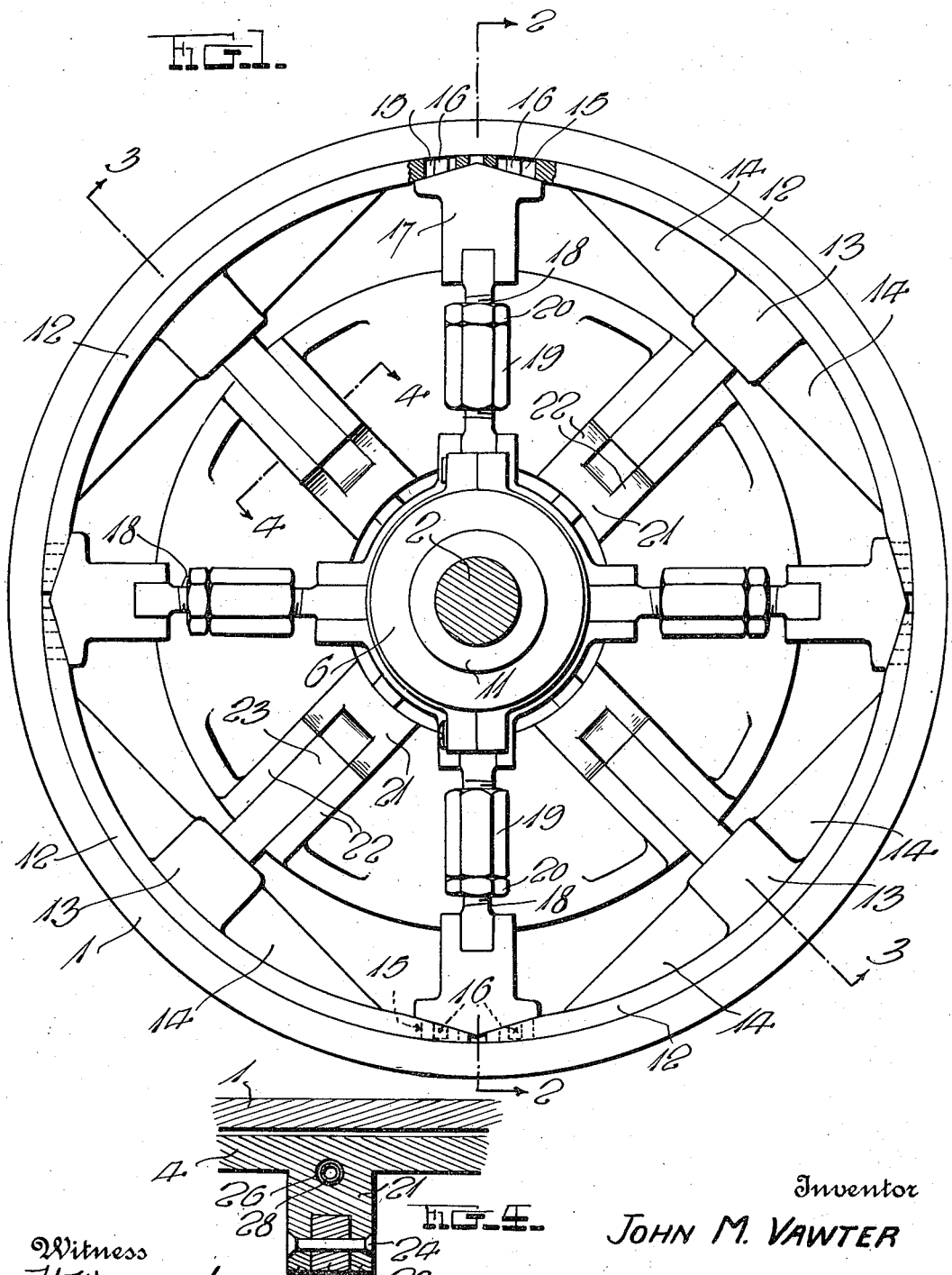

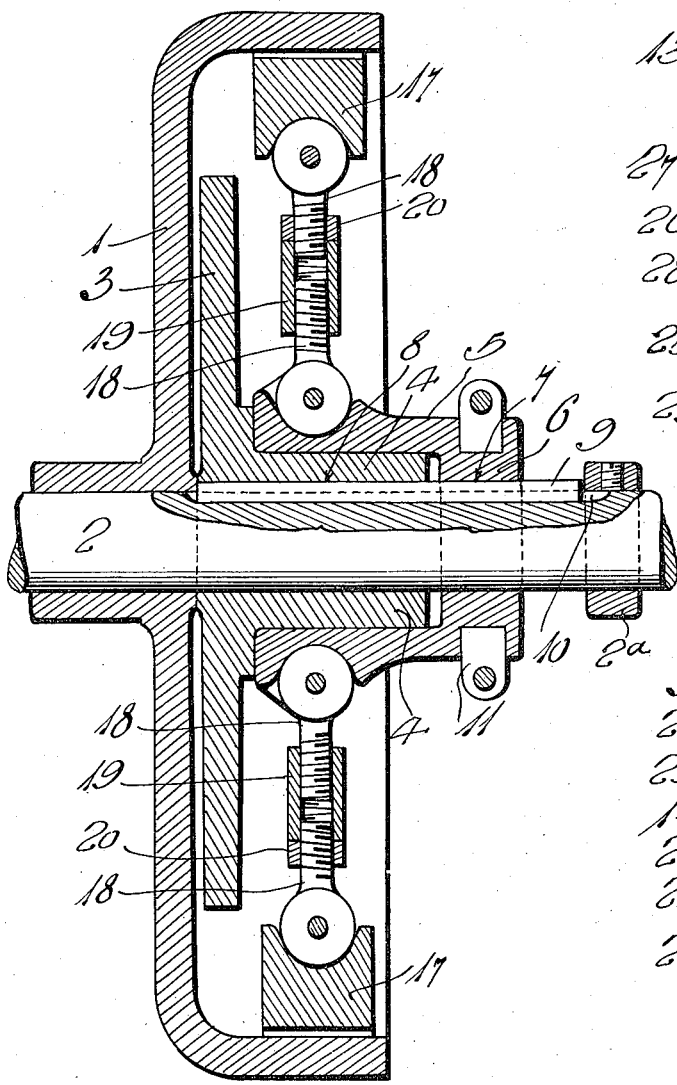
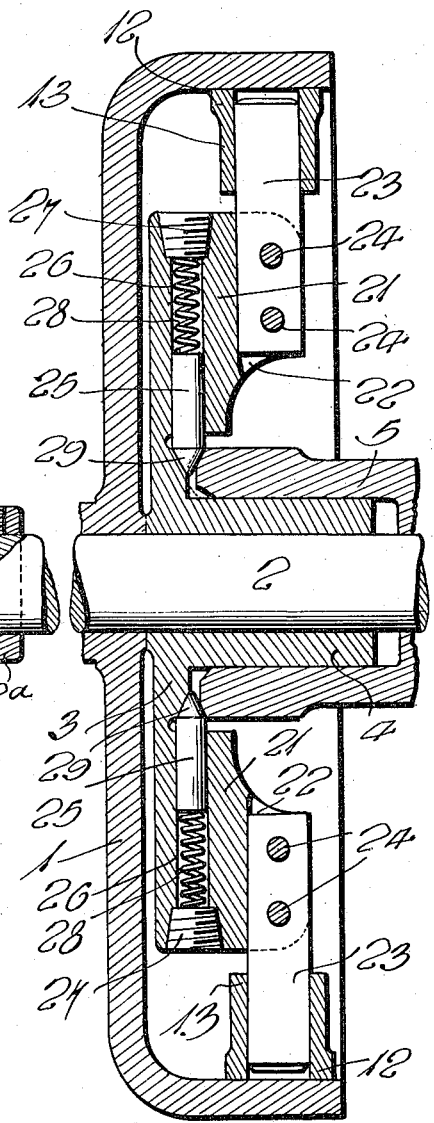

1,454,800

UNITED STATES PATENT OFFICE.

JOHN M. VAWTER, OF INDIANAPOLIS, INDIANA, ASSIGNOR OF ONE-HALF TO ISRAEL M. DRAPER, OF INDIANAPOLIS, INDIANA.

CLUTCH GOVERNOR.

Application filed January 16, 1922. Serial No. 529,628.

*To all whom it may concern:*

Be it known that I, JOHN M. VAWTER, a citizen of the United States, residing at Indianapolis, in the county of Marion and State of Indiana, have invented certain new and useful Improvements in Clutch Governors; and I do declare the following to be a full, clear, and exact description of the invention, such as will enable others skilled in the art to which it appertains to make and use the same.

This invention relates to an improvement in the construction of clutches and one object of the invention is to provide an improved governor construction for use in connection with the clutch so that when the load becomes too great and breakage is liable, the governor means will render the clutch inoperative and thus release the driven element.

Another object of the invention is to so construct the clutch mechanism that it will be normally held in an operative position, centrifugal force set up when the shaft is rotating at a relatively high rate of speed, holding the governor means in an inoperative position. It will thus be seen that with this construction, the gripping means for engaging the driven element may be moved to an operative position while the shaft is rotating at a high rate of speed and will remain in this position until the load becomes too great and the speed of rotation is reduced to a point where the governor means may move to cause the gripping means to be moved to a releasing position.

Another object of the invention is to provide a governor construction which can be used in connection with clutches having a construction such as now in use thus permitting the governor means to be applied to clutches of a conventional construction.

Another object of the invention is to provide a clutch and governor construction which will be simple in construction and strong and durable, and to further so construct the improved mechanism that it will be automatic in its operation.

This invention is illustrated in the accompanying drawings, wherein:

Figure 1 is a view showing the improved clutch in elevation, the shaft being shown in section.

Figure 2 is a sectional view taken along the line 2—2 of Fig. 1.

Figure 3 is a sectional view taken along the line 3—3 of Fig. 1.

Figure 4 is a fragmentary sectional view taken along the line 4—4 of Fig. 1.

The clutch is provided with the usual flanged disk or cup 1 which is loosely mounted upon the driven shaft 2 so that the shaft 2 may rotate without the clutch cup 1 necessarily rotating with it. A spider disk 3 fits upon the shaft 2 and is provided with an elongated hub 4. A collar 5 slidably fits upon the elongated hub 4 of the spider 3 and has its end portion 6 thickened so that it fits snugly upon the shaft 2. This collar or sleeve 5 has its thickened end portion 6 provided with a key-way 7 which will be alined with a key-way 8 formed in the hub 4 of the spider so that a securing key 9 which is to be seated in a key-way or seat 10 formed longitudinally in the shaft 2 may pass through these key-ways 7 and 8 and thus hold the spider and sleeve or collar 5 against rotation upon the shaft but permit the collar to be moved longitudinally upon the shaft and hub. An abutment ring 2ª is secured upon the shaft 2 and when secured in a set position as shown in Fig. 2 will serve to prevent the key 9 from moving out of the seat 10 and will further serve to limit movement of the sleeve or collar 5 longitudinally of the shaft. The usual split ring 11 is mounted in an annular groove formed in the second end portion of the collar 5 so that a gripping device of a conventional structure may be connected with this ring to impart sliding movement to the collar.

In order to impart rotary movement to the cup 1, there has been provided shoes 12 which are segmental in shape and fit within the cup. Each of these shoes is provided at its intermediate portion with a pocket 13 braced by webs 14. At the ends the shoes are provided with longitudinally extending slots 15 to receive lugs 16 provided upon heads 17. These heads 17 form the outer ends of arms which radiate from the collar 4 and serve to force the shoes into tight binding engagement with the cup 1. Each of the arms is provided with a truss construction and is constructed as clearly shown in Fig. 2. The threaded stems 18 are pivotally connected with the collar and heads 17 and are connected by an internally threaded sleeve 19 which may be locked by means of a lock nut 20. It will thus be seen that the arms may be longitudinally adjusted so that when the collar is moved to the operative position shown in Fig. 2, the arms will apply the proper pressure to the end portions of the shoes and force these shoes into tight binding engagement with the cup 1.

These shoes are to rotate with the spider 3 and therefore the spider has been provided with thickened shoulder portions 21 which extend in radiating relation to the spider and are provided with longitudinally extending side flanges 22 between which will be secured arms 23. The arms 23 are secured between the flanges 22 by means of rivets or other suitable fasteners 24 and these arms have their outer end portions fitting into the pockets or seats 13 of the shoes. It will thus be seen that when the spider is rotating, the shoes will also rotate and will impart rotary movement to the cup 1 when forced into tight engagement with the cup.

In order to permit the collar 5 to be forced away from the spider and thus release the shoes from binding engagement with the cup when it is desired to release the cup and permit it to turn freely upon the shaft, there has been provided plungers 25 which are slidably mounted in pockets 26 which extend through the enlargements 21 in radiating relation to the spider. These pockets 26 are provided at their outer ends with enlarged threaded portions forming cups to receive the threaded plugs 27 which will be screwed into place after the springs 28 have been dropped into the pockets. When the plugs are screwed tightly into place, the springs will be compressed and the collar will be retained in the position which will permit the shoes to move out of binding engagement with the cup. When the shaft is rotating, the spider will of course rotate with it and as the shaft rotates at a relatively high rate of speed, the plungers will be moved outwardly by centrifugal force set up. They will thus be held out of the way so that the collar can be moved along the extended hub of the spider to force the shoes into binding engagement with the cup. The cup will rotate with the shaft and spider when the shoes are in gripping engagement with the cup and if a belt is passed about the cup, rotary movement can be transmitted to operate any machine desired. If the machine being operated should be placed under strain which is more than usual and there was danger of injury in case the machine were not shut off, this shutting off of the delivery of power to the machine operated will be taken care of in the following manner. When the machine operated is placed under an extra heavy strain, the extra strain will cause the rotation of the cup and shaft to be slowed down. This might cause damage to the machine operating the shaft or damage to the machine being operated. When however, the speed of rotation reduces beyond a safe amount, the centrifugal force set up will be reduced and the springs 28 will move the plungers inwardly toward the shaft. The tapered end portion 29 of these plungers will engage the end of the hub and this hub will be forced by cam action longitudinally of the hub 4 away from the spider. The shoes will then be released from gripping engagement with the cup and the shaft will be left free to rotate at its normal rate of speed, without rotary movement being imparted to the cup. When it is again desired to have the machine operated, it is simply necessary to move the collar 5 along the hub 4 towards the spider again and since the plungers have again been moved by centrifugal force to the inoperative position, the collar can move to the position necessary to force the shoes into binding engagement with the cup. It will thus be seen that with this construction, the clutch can be operated in the usual manner and can be manually moved into and out of an operative position and that when necessary, the collar may be automatically moved to release the shoes from binding engagement with the cup.

I claim:

1. In a structure of the character described, a rotary shaft, a clutch cup loose upon the shaft, a spider turning with the shaft, a collar turning with the shaft and slidable longitudinally thereon towards and away from the spider, gripping shoes within the cup, means for bringing the shoes into binding engagement with the cup when the collar is moved towards the spider, arms extending from said spider and engaging the shoes to move the shoes with the shaft, spider and collar when the shaft is rotating, means slidably carried by the spider in radiating relation to the collar for engaging the collar and moving the collar away from the spider to release the shoes from binding engagement with the cup, and resilient means yieldably holding the collar moving means in an operative position, said collar moving means being moved to an inoperative position by centrifugal force set up when the shaft and spider are rotating at a relatively high speed.

2. In a structure of the character described, a rotary shaft, a clutch cup loose upon the shaft, a spider turning with the shaft, a collar turning with the shaft and slidable longitudinally thereon towards and away from the spider, gripping shoes within the cup, means for bringing the shoes into binding engagement with the cup when the collar is moved towards the spider, arms extending from said spider and engaging the shoes to move the shoes with the shaft, spider and collar when the shaft is rotating, plungers slidably carried by the spider and movable radially thereof into and out of position for engaging the collar and moving the collar away from the spider to render the shoes inoperative, and resilient means yieldably holding the plungers in an operative position, the plungers being held in an inoperative position by centrifugal force set up when the shaft and spider are rotating at a relatively high speed.

3. In a structure of the character described, a rotary shaft, a clutch cup loose upon the shaft, a spider within the cup provided with an extended hub keyed to the shaft, a collar splined to the shaft and slidably fitting upon the hub of said spider, gripping shoes within the cup, each provided with a seat intermediate its length, arms radiating from the collar and engaging the ends of the shoes to force the shoes into gripping engagement with the cup when the collar is moved towards the spider radiating shoulders formed upon the spider and having pockets formed therein, arms extending from the shoulders and fitting into the seats of the shoes to impart movement to the shoes as the shaft and spider rotate, plungers slidably mounted in the pockets, and springs in the pockets moving the plungers towards the shaft for engaging the collar and moving the collar to release the shoes from binding engagement with the cup, centrifugal force set up during rotation tending to move the plungers to an inoperative position against the action of the springs.

4. In a structure of the character described, a rotary shaft, a clutch cup loose upon the shaft, a spider upon the shaft within the cup and having a hub extension keyed to the shaft, a collar slidably fitting upon the hub and shaft and splined to the shaft, shoes within the cup for frictionally gripping the cup, actuating means for the shoes carried by the collar and engaging the end portions of the shoes for forcing the shoes into gripping engagement with the cup when the collar is moved towards the spider, arms radiating from the spider, and engaging the shoes to move the shoes with the spider when the shaft is rotating, cam plungers slidably mounted in sockets formed in the spider in radiating relation to the hub, springs in the sockets engaging the plungers, and plugs closing the sockets and compressing the springs to force the plungers into engagement with the end of the collar and move the collar away from the spider, centrifugal force moving the plungers away from the collar when the shaft and spider are rotating.

5. In a structure of the character described, a rotary shaft, a disk loose upon the shaft and having an annular side flange, a spider positioned within the annular flange and having a hub portion slidably fitting upon the shaft and held against rotation thereon, segmental gripping shoes for frictionally gripping the inner face of the flange, a collar fitting upon the shaft and hub and slidable longitudinally of the shaft and hub, wedge elements for engaging the ends of the shoes, longitudinally adjustable arms pivotally connected with the collar and wedges for moving the wedges outwardly and forcing the shoes into tight binding engagement with the flange when the collar is moved towards the spider, arms carried by the spider and fitting into sockets in the shoes intermediate the length thereof for rotating the shoes with the shaft and spider, plungers slidably mounted in radiating sockets formed in the spider and having tapered end portions engaging the end of the collar, springs in the sockets engaging the plungers and plugs closing the sockets and engaging the springs to compress the springs and force the plungers inwardly.

In testimony whereof I have hereunto set my hand.

JOHN M. VAWTER.